Nov. 15, 1955  J. H. BORNZIN  2,723,572
FULL FLOATING FLY-WHEEL
Filed April 12, 1952
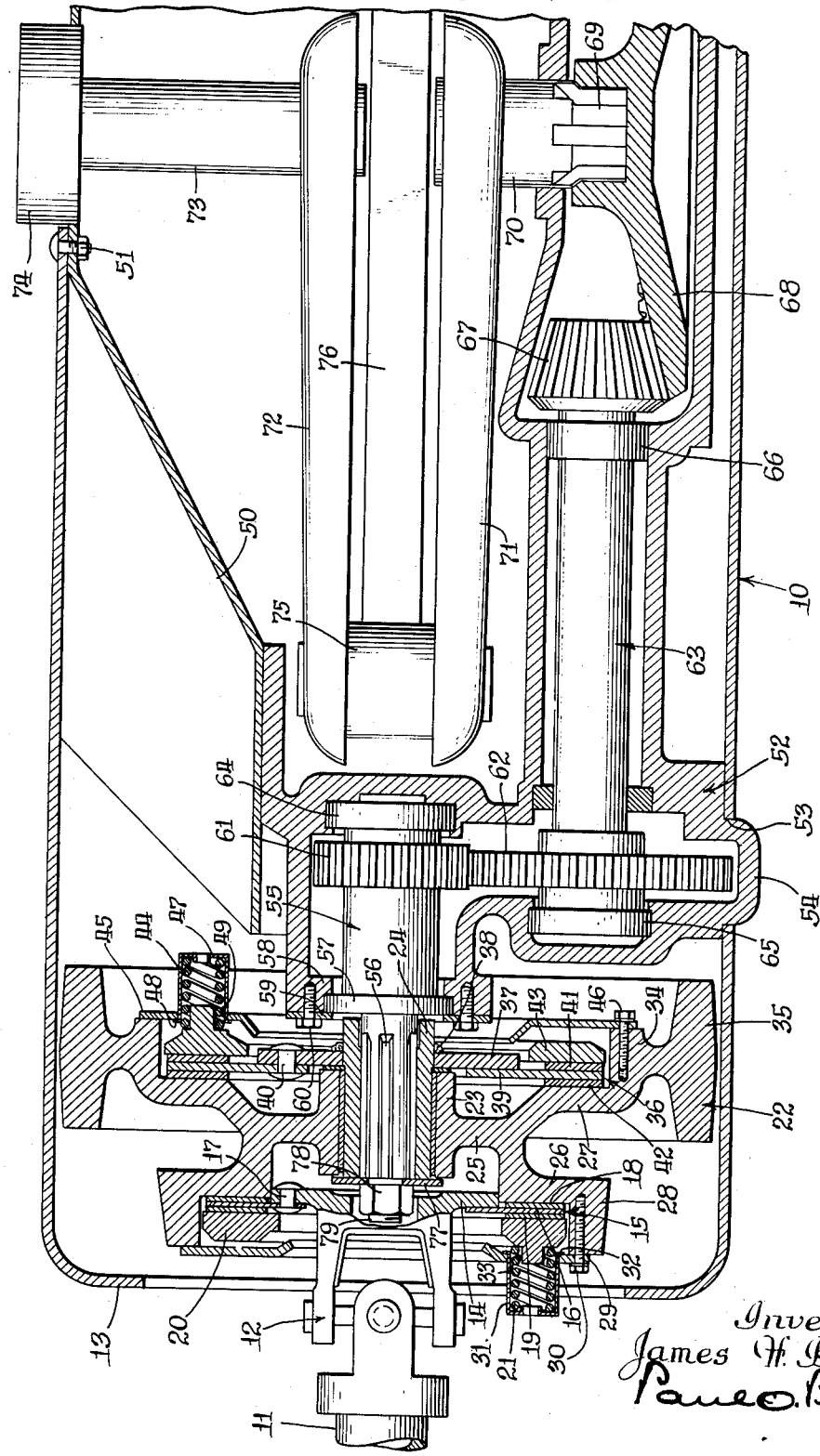
Inventor
James H. Bornzin
Paul O. Pippel
Atty

United States Patent Office 2,723,572
Patented Nov. 15, 1955

2,723,572
FULL FLOATING FLY-WHEEL

James H. Bornzin, Memphis, Tenn., assignor to International Harvester Company, a corporation of New Jersey Application April 12, 1952, Serial No. 282,029

3 Claims. (Cl. 74—572)

This invention relates to a new and improved full floating fly-wheel.

Fly-wheels connote the rotational movement of relatively large inertia masses. Such fly-wheels as a rule are used in order to maintain relatively constant driving speeds of mechanical elements. The adaptation of the fly-wheel of the present invention is primarily for use with hay balers but obviously may be used on any machine or apparatus employing a fly-wheel as an intermediate part of a drive. More particularly the present invention relates to an improvement over the device as shown in the copending application entitled "Friction Drive Fly-Wheel for Hay Baler" having Serial Number 197,396 and filed November 24, 1950. This copending application as its title suggests discloses friction drive elements in combination with the fly-wheel in order to compensate for irregularities in either input or output speeds of rotation and the yieldable friction clutch means is arranged to slip in either direction to compensate for these irregularities.

A principal object of the present invention is to provide a full floating fly-wheel for drive mechanisms whereby associated mechanical driving and driven elements will be saved from breakage in the event there is any tendency whatever to vary the input or output speeds of rotation adjacent the large mass fly-wheel.

Another important object of this invention is the provision of yieldable clutch means in association with both the input and output sides of a fly-wheel and the respective yieldable clutch means having a differential in size or effective frictional engagement area to compensate for the added load of mass of the fly-wheel on the output side of the drive.

Another important object of this invention is to supply a full floating fly-wheel for use in machinery including the transmitting of drive through a fly-wheel to working elements and wherein the fly-wheel is cushioned on both sides thereof to eliminate destructive shock loads to adjoining drive elements, and wherein the cushioning means is a yieldable rotational friction clutch means between an input drive shaft and the fly-wheel and between the fly-wheel and an output drive shaft with the yieldable friction clutch means between the fly-wheel and the output drive shaft being larger in size than the yieldable friction clutch means between the input shaft and the fly-wheel to compensate for the added mass of the fly-wheel to the driving assembly.

Other and further important objects of this invention will become apparent from the disclosures in the following specification and accompanying drawing.

In the drawing the figure shows a longitudinal sectional view taken through the forward end of a bale forming chamber and including the driving elements for imparting reciprocal drive to a hay baler compressing plunger.

As shown in the drawing the reference numeral 10 indicates generally the forward portion of a bale forming chamber as used on a hay baler and shown in greater detail in my copending application mentioned above having Serial Number 197,396. The forward portion of the bale forming chamber 10 houses the power transmitting means for carrying drive through an input shaft which receives its drive from an engine or the like (not shown) to a reciprocating plunger (not shown) which is adapted to compress the hay inserted within the bale forming chamber 10.

An input drive shaft 11 delivers rotational drive to a universal joint 12 which constitutes a part of the input drive shaft 11. The shaft 11 thus may have various angular dispositions with respect to the front end 13 of the bale forming chamber 10 without impairing the transmission of driving power to the baler. The rearward end of the universal joint 12 fixedly carries the hub 14 of a friction type yieldable rotational clutch member. The clutch member for purposes of convenience will be identified broadly by the numeral 15. In addition to the hub portion 14 the clutch element 15 comprises an annnular disk 16 which is riveted or otherwise fastened as shown at 17 to the hub 14. A friction ring face 18 is applied to one surface of the annular disk 16 and similarly a friction ring face 19 is applied to the other surface of the disk 16. A pressure ring 20 is arranged and constructed to abut the friction face 19 of the clutch 15 and with the aid of springs 21 the backup-ring 20 is urged in a longitudinal direction lengthwise of the bale forming chamber 10 and toward a large mass fly-wheel 22.

The fly-wheel 22 or the inertia member as it may be called includes a ring-shaped hub 23 for free journal mounting over an output shaft 24. Extending radially upwardly from the hub 23 is an annular disk portion 25 which terminates in a fork defining laterally spaced portions 26 and 27. The portion 26 includes a forwardly extending annular flange 28. This annular flange 28 encloses the clutch member 15 and the wall 26 is adapted to receive the urging force of the friction clutch face 18. A disk-like shield 29 is bolted or otherwise fastened to the forward edge of the flange 28 as shown at 30 and provides the reactance for the springs 21. As shown in the drawing the coil spring 21 is carried in a cup member 31 which is flanged at its forward edge at 32 to enable the cup 31 to grip the underside of the shield 29 adjacent an opening 33 through the shield. The spring 21 thus directly acts to urge the pressure plate 20 in a rearward direction and to cause the friction faces 18 and 19 to be compressed between the wall 26 of the fly-wheel 22 and the yieldable back-up ring 20.

The other laterally spaced portion 27 of the flywheel 22 similarly includes a rearwardly extending annular flange 34 comparable to the forwardly extending flange 28 of the spaced portion 26. The mass of the fly-wheel is primarily carried in an annular rim 35 located outside the flange 34. A second yieldable rotational clutch means 36 is disposed between the fly-wheel 22 and the output shaft 24 to be driven. The clutch 36 includes a hub 37 which is welded at 38 to the output shaft 24. An annular disk 39 comparable to the disk 16 is riveted or otherwise fastened at 40 to the hub 37. Friction clutch faces in the form of annular rings are provided around the outer portion of the disk 39 as shown at 41 and 42. A yieldable back-up ring 43 is adapted to urge the friction clutch 36 against the wall 27 of the fly-wheel 22. Spring means 44 are adapted to urge the ring 43 forwardly for a compression of the friction clutch 36 against the fly-wheel 22. A shield member 45 comparable to the shield 29 is fastened by means of bolts 46 to the rearward edge of the flange 34 and provides the reactance member for the spring means 44. The coil spring 44 is mounted in a cup enclosure 47 which is anchored by means of an annular flange 48 within an opening 49 in the shield 45.

A bracket 50 fastened to the inner wall of the bale forming chamber 10 by bolt means 51 is arranged to rigidly support a gear housing 52 within the bale chamber 10. An opening 53 in the wall of the bale forming chamber 10 permits the passage thereto of an extending portion 54 of the gear housing 52 and thus the gear housing is centered and securely held in its proper position in the bale forming chamber 10 by reason of the joint action of the bracket 50 and the projection 54 engaging the opening 53 at a position in the bale chamber 10 on an opposite wall thereof from the wall carrying the bracket 50.

A shaft 55 is journaled within the gear housing 52 and at its forward end is provided with a splined surface 56 for engagement centrally within the internally splined output shaft 24. An annular shoulder 57 on the shaft 55 abuts an internal flange 58 of the gear housing 52 and a cap member 59 bears against the other wall of the shoulder 57 to maintain the shaft 55 against separate longitudinal movement within the gear housing 52. The ring-like cap 59 is fastened to the gear housing 52 by means of bolts or the like 60. A spur gear 61 is mounted on the shaft 55 within the gear housing 52 and engages a relatively large gear 62 which is mounted on a laterally disposed shaft 63 lying parallel to the output shaft which should be understood to include the shafts 24 and 55. The shaft 55 in addition to its journal mounting by reason of the annular shoulder 57 is additionally guided within a spaced apart end bearing 64. The laterally offset shaft 63 is supported in spaced bearings 65 and 66 within the gear housing 52. The rearmost end of the shaft 63 carries a small beveled pinion gear 67 for engagement with a relatively large bevel gear. The bevel gear 68 is splined as shown at 69 to a transversely disposed shaft 70. The inner end of the shaft 70 carries a crank arm 71 which cooperates with a spaced apart crank arm 72 which is mounted on a shaft 73 in alignment with but spaced from the shaft 70. The shaft 73 is journally mounted within a bearing member 74 carried on the bale forming chamber 10. The parallel crank arms 71 and 72 are joined by a cross pin 75 which carries a pitman 76 for imparting reciprocal drive to a bale forming plunger not shown. Fly-wheel 22 and the output shaft 24 are maintained in fixed position with the shaft 55 by reason of a cap member 77 engaging the outer ends of the shaft 24 and the hub 23 of the fly-wheel 22. A nut 78 engages a threaded extension 79 of the shaft 55.

The relative sizes or the relative effective frictional engagement areas of the first friction clutch 15 and the second friction clutch 36 contribute to the successful operation of a full floating fly-wheel. The friction clutch 15 is arranged and constructed to cushion the load from the source of drive up to but not through the fly-wheel 22. In contradistinction the friction clutch 36 must cushion the load throughout the entire input driving mechanism which now includes the fly-wheel and on backwardly through the output driven side of the mechanism. It has thus been discovered that the second friction clutch 36 must be relatively greater in size or effective frictional engagement area than the friction clutch 15 to compensate for the added load of the inertia fly-wheel member 22. There is thus a differential between the respective effective frictional engagements of the yieldable clutch means 15 on the input side of the fly-wheel as against the yieldable clutch means 36 on the output side of the inertia fly-wheel.

In the operation of the device of this invention drive by some means such as an engine is delivered to the input shaft 11 whereupon it progresses through the universal joint 12 and thus to the yieldable rotational clutch means 15 whereupon under ordinary conditions the spring means 21 is sufficiently great to cause the clutch 15 to impart the input drive to the inertia fly-wheel member 22. The inertia fly-wheel member 22 smooths out slight irregularities in the input drive by reason of slight slippages within the friction clutch 15. Thereafter the drive from the fly-wheel is imparted to the second and larger or more effective friction clutch 36 for delivery of the drive to the output shaft 24. As previously stated, the enlarged friction clutch means 36 is thus capable of absorbing or cushioning the entire drive means with the added mass of the fly-wheel 22. Thus in the same manner as the input drive shaft and universal joint along with any other associated drive elements are cushioned the output drive shafts 24 and 55 and all the associated gear elements 61, 62, 67 and 68 are likewise cushioned against undue shock loading by reason of slippages within the friction clutch 36. Thus a cushioned rotational output drive is delivered from the inertia fly-wheel member 22 to the pitman 76 for the purpose of accomplishing bale compression by reason of a plunger not shown. Obviously the cushioned fly-wheel of this invention may be employed in any drive means wherein there is an input drive to a fly-wheel and an output driven shaft or elements therefrom.

Various details of construction may be varied throughout a wide range without departing from the principles disclosed herein and I therefore do not propose limiting the patent granted hereon otherwise than is necessitated by the appended claims.

I claim:

1. A fly-wheel assembly comprising an inertia fly-wheel member, an output driven shaft, said inertia fly-wheel member journaled for rotation on said output shaft, an input drive shaft in substantial axial alignment with said output shaft and having their inner ends spaced apart, a first yieldable rotational clutch means positioned directly between said input drive shaft and said inertia fly-wheel member to cushion irregularities in the driving of said input shaft, first spring means normally urging said first clutch means into a driving relationship between said input drive shaft and said inertia fly-wheel member and a second yieldable rotational clutch means having a more effective engagement than the first clutch means, said second clutch means positioned directly between said output shaft and said inertia fly-wheel member to cushion irregularities through the entire fly-wheel assembly, and second spring means normally urging said second clutch means into a driving relationship between said output shaft and said inertia fly-wheel member.

2. A device as set forth in claim 1 in which the inertia fly-wheel member has laterally spaced apart walls for separate engagement by said first and second yieldable rotational clutch means, and said spaced apart walls disposed on opposite sides of the journaling of the fly-wheel on the output shaft.

3. A fly-wheel assembly comprising an inertia fly-wheel member, an output driven shaft, said inertia fly-wheel member journaled for rotation on said output shaft, an input drive shaft in substantial axial alignment with said output shaft and having their inner ends spaced apart, a first yieldable rotational clutch means positioned intermediate said input drive shaft and said inertia fly-wheel member to cushion irregularities in the driving of said input shaft, and a second yieldable rotational clutch means having a more effective engagement than the first clutch means, said second clutch means positioned intermediate said output shaft and said inertia fly-wheel member to cushion irregularities through the entire fly-wheel assembly, said inertia fly-wheel member having laterally spaced apart walls for separate engagement by said first and second yieldable rotational clutch means, said first and second yieldable rotational clutch means including friction faces and spring means for urging said friction faces into engagement with the laterally spaced apart walls of the inertia fly-wheel member and said second clutch means having a greater effective frictional engagement area with its respective wall than the first of said clutch means.

References Cited in the file of this patent

UNITED STATES PATENTS

| | | |
|---|---|---|
| 554,138 | Negbaur et al. | Feb. 4, 1896 |
| 1,424,987 | Clark | Aug. 8, 1922 |
| 1,753,365 | Daukus | Apr. 8, 1930 |
| 1,767,916 | Coleman | June 24, 1930 |
| 1,813,957 | Robertson | July 14, 1931 |
| 1,827,891 | Jones | Oct. 20, 1931 |
| 1,982,658 | Griswold | Dec. 4, 1934 |